UNITED STATES PATENT OFFICE.

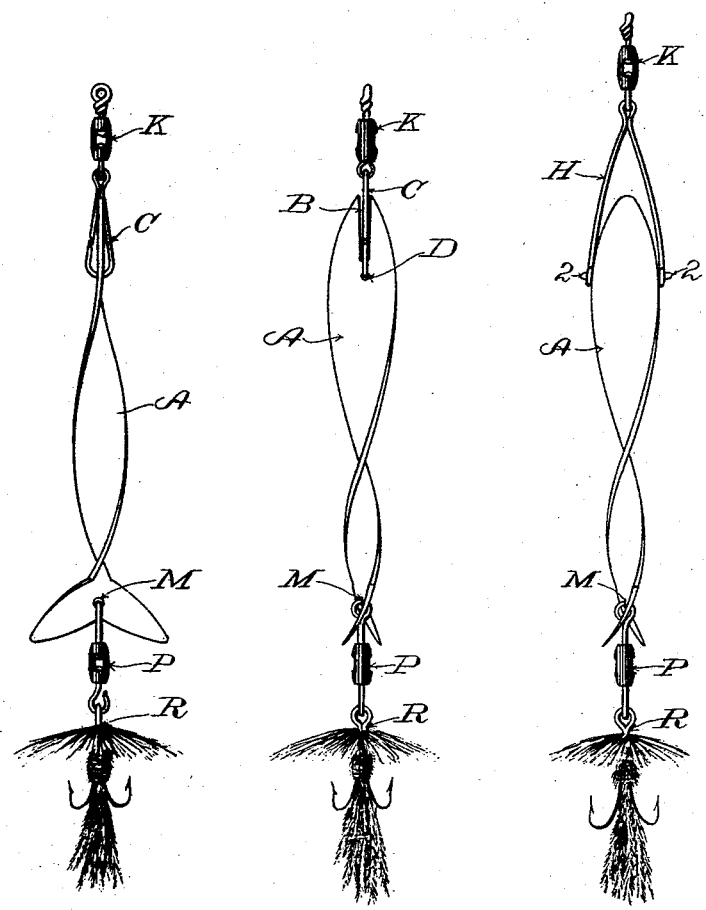

HENRY O. STANLEY, OF DIXFIELD, MAINE.

ARTIFICIAL MINNOW.

SPECIFICATION forming part of Letters Patent No. 570,687, dated November 3, 1896.

Application filed March 4, 1896. Serial No. 581,844. (No model.)

*To all whom it may concern:*

Be it known that I, HENRY O. STANLEY, a citizen of the United States, residing at Dixfield, in the county of Oxford and State of Maine, have invented certain new and useful Improvements in Artificial Minnows, of which the following is a specification, reference being had therein to the accompanying drawings.

My invention has for its object to provide an artificial-minnow bait which, when in use, will resemble in appearance and action a live-minnow bait more closely than other devices of the class which have been produced heretofore.

In Letters Patent No. 552,012, dated December 24, 1895, granted to me, a minnow bait is shown and described, and my present invention is an improvement thereon; and it consists in an artificial minnow constructed and arranged as hereinafter more fully set forth, and the novel features of which I have particularly pointed out and clearly defined in the claims at the end of this specification.

In the following description reference is made to the accompanying drawings, in which—

Figures 1 and 2 are side and plan views, respectively, of an artificial minnow embodying my invention, the swivel by which the line is attached being shown, as also the hooks and swivel by means of which the hooks are attached to the tail of the minnow. Fig. 3 is a modification hereinafter referred to.

In the device shown in my said Letters Patent above referred to the minnow is preferably formed by casting, the form of the live specimen being reproduced in substantially its natural dimensions. This required the use of a considerable amount of metal, and also resulted in a heavier bait than is desirable. In a bait thus constructed, in order to obtain the darting or zigzag movement of the bait in the water when in use, it is necessary to make the line connection near the middle of the bait, and this in turn necessitated the use of guides arranged at the sides of the head of the minnow, so that its oblique position relatively to the line might be limited. By my present invention I am enabled to obtain not only the rotary movement of the minnow on its own lengthwise axis, but also the darting or zigzag movement from side to side, while at the same time avoiding the use of a considerable amount of metal, as also the use of guides to limit the oblique movement relatively to the direction of the line, and produce a lighter bait and one less expensive to construct. These results are obtained in my present invention by the employment of a different principle of construction from that employed in the minnow shown in my said Letters Patent above referred to, and I will now describe the construction and mode of operation of my present device.

The minnow proper is shown at A, and is formed out of a flat sheet or strip of metal, preferably aluminium, which is cut to the general contour of a live minnow when seen in side elevation. The piece thus formed to shape is then twisted upon itself and made to assume the shape shown, Figs. 1 and 2, the lobes of the tail being oppositely set, as will be clear from Fig. 1. The precise contour of the flat piece, which is cut from the sheet as above described, may be varied in accordance with the conditions of use, and also with the live bait which it is designed to resemble.

Any suitable material may be employed, although aluminium, because of its color, weight, and slight corrodibility, is preferred.

By forming the minnow with a twist, as shown and above described, it will, when drawn through the water, be caused to turn over or rotate on a line lengthwise thereof.

The head or forward portion of the minnow is provided with a transverse slot or opening B, which extends longitudinally from the nose to a point corresponding substantially in location with the gill-opening in a live specimen. This opening or slot permits the line or line-attaching device to pass from side to side of the head or forward portion of the minnow as it changes from one oblique course to another in traversing a zigzag course. Directly behind the inner end of this transverse slot or opening is a hole D, which serves to secure the line or leader or line-attaching device like the link or hook C. I prefer to use a line-attaching device C, which is preferably constructed in the form of a closed hook, as shown, Fig. 2. To the forward end of the hook or link C a swivel K is secured, and to the swivel K is secured the line or leader. (Not shown.) A hole M at the tail of the minnow is or may be provided for the attachment of the hook-swivel P, and to the latter is secured, preferably, a treble-ironed hook R, of well-known construction, to which is applied a suitable hackle, body, and wing-feathers, of well-known construction. Any other desired lure may be substituted for the hackle and feathers just mentioned.

It will be noted that the link or hook C may play from side to side of the head of the minnow through the transverse slot B, and that a portion of the head of the minnow projects in front of the hole D, at which point the line connection is made through the swivel K and link C. When a minnow constructed as shown and described is drawn through the water it will vibrate relatively to the line of draft and will traverse a zigzag course, darting from side to side while pursuing a course the general direction of which is that of the line to which the minnow is attached. In addition to its darting movement it will rotate on its long axis, due to the twist in its body, and when thus in rapid rotation it resembles very closely in form a live-minnow bait.

I do not desire to limit my invention to a minnow made from a flat sheet or strip of material, as I do not consider this feature essential to my invention. So far as I have been able to determine, the vibrating or darting movement of the minnow, above described, which is one of its most important features, is due to the proportion or ratio which the surface of that portion thereof which is forward of the point of attachment of the line or line-securing device bears to the surface of that portion which is rearwardly thereof, so that when the minnow is drawn through the water some possibly accidental increase in pressure on one side of the head or forward portion causes the minnow to be laterally deflected, and this pressure continuing causes the minnow to traverse one leg of the zigzag course. It will continue on this leg of its course until the pressure on the rear portion of the minnow, due to its assuming a position more nearly at right angles with the line, overcomes the pressure on the side of the head, when it will suddenly change to an oblique course opposite to that which it has been following, that is, it will change to another leg of its zigzag course.

By the construction hereinabove set forth the minnow is permitted to be deflected from a straight course by pressure applied in front of the point of line attachment, while the extent of surface to the rear of the said point is sufficient to enable the pressure thereon to operate to bring the length of the minnow again into the line of draft after divergence therefrom.

At Fig. 3 I have shown a modified form of line-attaching device consisting of a yoke-shaped attachment H, preferably of wire, which is secured pivotally to pins 2 projecting from the upper and under sides of the minnow at the point in the length of the minnow at which the hole D is placed. This construction will permit the minnow to operate in the same manner as the construction first above described, and by its employment the transverse slot B is rendered unnecessary.

I have not shown hooks applied to the sides of the minnow A, but, as will be obvious, hooks may be secured or applied to the sides thereof in any well-known manner, if desired.

What I claim is—

1. An artificial minnow provided with means for insuring rotation when drawn through the water and having a pivotal connection with its draft device at a point in its length back of the head and with the excess of area at the rear of the pivotal point, and free to vibrate relatively to said draft device at said point, whereby the water-pressure against the surface at the rear of such point is enabled to limit the extent of the vibration and to operate to bring its length again into the line of draft after divergence therefrom, substantially as shown and described.

2. An artificial minnow provided with means for insuring rotation when drawn through the water and having a longitudinal slot or opening extending rearwardly from the nose thereof, a hole directly at the rear of the inner end of said opening, said hole being located at a point back of the head and with the excess of area at the rear of said hole, and a link or line-attaching device secured to said hole and free to play through said opening, substantially as set forth.

3. An artificial minnow having the body thereof formed from a flat strip of material cut to the proper contour and twisted upon itself to cause rotation, and having a longitudinal opening or slot extending rearwardly from the nose thereof and having a hole for securing a line or draft device at a point back of the head and with the excess of area at the rear of said hole.

In testimony whereof I affix my signature in presence of two witnesses.

HENRY O. STANLEY.

Witnesses:
 CHAS. P. RICKER,
 FRED A. TUCKER.